April 16, 1968  L. W. ALVAREZ  3,378,326
GYROSCOPICALLY CONTROLLED ACCIDENTAL MOTION
COMPENSATOR FOR OPTICAL INSTRUMENTS
Filed Sept. 12, 1963  4 Sheets-Sheet 1

INVENTOR.
LUIS W. ALVAREZ
BY
Lippincott, Ralls & Hendrickson
ATTORNEYS

April 16, 1968 L. W. ALVAREZ 3,378,326
GYROSCOPICALLY CONTROLLED ACCIDENTAL MOTION
COMPENSATOR FOR OPTICAL INSTRUMENTS
Filed Sept. 12, 1963 4 Sheets-Sheet 2

INVENTOR.
LUIS W. ALVAREZ
BY
Lippincott, Ralls & Henderson
ATTORNEYS

April 16, 1968

L. W. ALVAREZ 3,378,326

GYROSCOPICALLY CONTROLLED ACCIDENTAL MOTION
COMPENSATOR FOR OPTICAL INSTRUMENTS

Filed Sept. 12, 1963

INVENTOR.
LUIS W. ALVAREZ

BY

Lippincott, Ralle & Hendrickson
ATTORNEYS

United States Patent Office 3,378,326
Patented Apr. 16, 1968

3,378,326
GYROSCOPICALLY CONTROLLED ACCIDENTAL MOTION COMPENSATOR FOR OPTICAL INSTRUMENTS
Luis W. Alvarez, Berkeley, Calif., assignor, by mesne assignments, to Bell & Howell Company, Chicago, Ill., a corporation of Illinois
Filed Sept. 12, 1963, Ser. No. 308,486
9 Claims. (Cl. 350—16)

The present invention relates generally to the stabilization of optical systems against small angle deviations thereof from a desired line of sight, and is more particularly directed to automatic accidental motion compensation for cameras, telescopes, field glasses, and other optical instruments, which is arranged to provide stationary optical images despite accidental displacement or motion of the instrument relative to the line of sight which may arise, for example, from the unstable holding of the instrument by hand.

In the use of a hand-held optical instrument, such as a camera, small accidental motions of the housing thereof unavoidably produce a jiggle or oscillation of the image at the focal plane. In a moving picture camera this jiggle is recorded on successive frames of the film as an undesirable component of picture motion and although the actual physical displacement of the frames on the film strip is minute, magnification and projection of the pictures causes the jiggle to become quite noticeable as a continuous motion which detracts from the professional quality thereof.

The present invention overcomes difficulties of accidental motion with hand-held optical instruments, by providing a stabilized optical system that compensates for accidental displacement of the instrument. The present invention stabilizes the optics themselves, in contrast to certain prior art arrangements wherein the entire instrument containing an optical system is stabilized against accidental displacements. In simple form, the present invention comprises a camera having a plano-concave and a plano-convex lens mounted in mating rotatable relation to each other. One of the lenses is fixed to the housing of the camera and the other is supported by a substantially free gyro. The center of the gyro gimbals is placed at the center of curvature of the mating lenses. The lenses generate a prism having a variable wedge angle which is substantially equal to angular housing motions. Consequently, light rays enter the film gate of the camera in fixed relation irrespective of angular deviations of the camera from the intended line of sight.

This invention also provides more complex systems wherein a series of prisms are formed by a plurality of pairs of lenses for additional compensation, as set forth below. Furthermore, the invention provides for panning of a camera by automatically servoing the gyro with camera housing motions greater than some predetermined small angle. The invention thus compensates for small accidental motions, but not larger intentional camera movement.

There have been previously developed certain "stabilized optical systems," suitable for use with surveying instruments and the like, which employ pendulums to translate part of a lens system relative to other parts. Such prior advances are exemplified, for example, in the system of Rantsch, U.S. Patent No. 2,959,088. Pendulous systems of this general nature cannot compensate for accidental motion inasmuch as they are clearly limited to operation in a single dimension and, furthermore, would be subject to intolerable oscillations if repeatedly jiggled, as in a hand-held instrument. This invention, on the other hand, provides for a relative lens rotation to compensate in two dimensions and does not suffer from oscillation limitations so that it is particularly adapted for accidental motion compensation.

The present invention is also adapted to overcome chromatic aberration and this is accomplished by the use of additional pairs of lens elements. One element of each pair is secured to the housing and the other element is connected to the gyro. The respective pairs of lens elements are so arranged that the net dispersion of light rays therethrough is zero while the deflection angles of the pairs of lens elements add up to the deviation angle of the housing from the line of sight. The resulting stabilized compound lens is hence achromatic, as well as stabilized against accidental movement of the camera housing.

Aside from its use in a camera, the stabilized optics of the present invention is applicable, with slight modification, to field glasses, telescopes, and other optical instruments having an image field of view. In this latter type of optical instrument, the eye of an observer is displaced from the focal plane of the instrument and is movable with respect to the instrument housing. The present invention provides for stabilization of an image in field glasses, telescopes, and other optical instruments where an image field of view is involved, by the introduction of an additional small correction which is inversely proportional to the magnification of the over-all optical system. In such instances, the stabilized lens system is arranged to undercompensate or overcompensate, depending upon whether an erect or inverted image respectively is produced, such that the image is fixed in space for viewing by an observer despite small angle accidental movement of the instrument housing.

A better understanding of the invention may be had from the following illustrative description and the accompanying drawings, wherein.

Figures 1, 2:
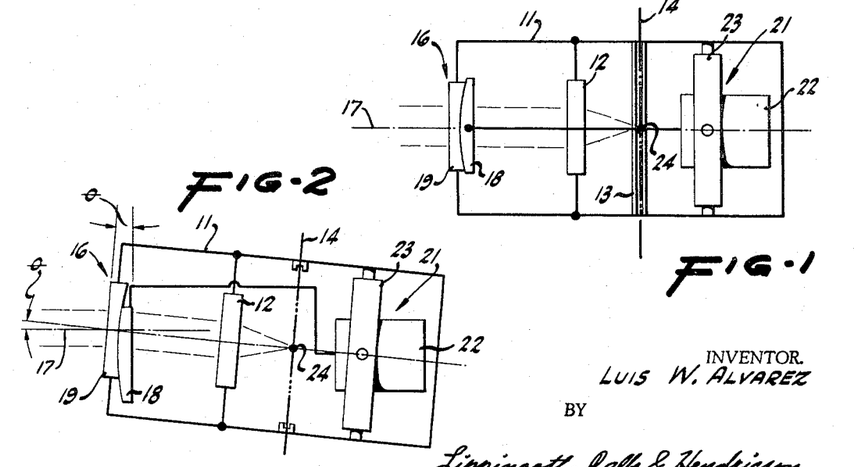
FIGURE 1 is a schematic illustration in elevation view of a camera, or equivalent optical instrument having a fixed image plane, with a stabilized optical system in accordance with the present invention incorporated therein.
FIGURE 2 is a schematic illustration in plan view of the camera of FIGURE 1, and with the camera deviated from an original line of sight to illustrate the motion compensating action of the stabilized lens system.

The invention in its broader aspects is illustrated in FIGURES 1 and 2 with respect to a movie camera, which will be seen to include an optical housing 11 containing an objective lens 12 for focusing incoming light rays upon a film gate 13 located at a focal plane 14 extending transversely of the housing. A stabilized lens system in accordance with the present invention is incorporated in the camera and includes a compound lens 16 which is arranged to compensate for accidental displacement of the housing from an original line of sight axis 17. The compound lens is mounted at the front of the housing and directs light rays upon the objective lens, and it will become apparent hereinafter that the compound lens functions as a variable prism. In the present instance for purposes of illustration only, the stabilized compound lens includes positive and negative plano-convex and plano-concave lenses 18 and 19 having an index of refraction of two. These lenses are disposed with their curved faces in mating rotatable relationship to each other, and one of the lenses, in the present instance the negative lens 19, is secured in fixed relation to the housing in coaxial alignment with the objective lens. The other lens (in this case, the positive lens 18) is held in fixed spatial alignment with the original line of sight axis by means of a gyro stabilizer 21 coupled thereto.

The gyro stabilizer includes a gyro 22 mounted within the camera housing by means of gimbals 23 which substantially freely suspend the gyro in space. The gyro resists movement from a previous spatial orientation such that the lens connected thereto is thereby maintained in alignment with an initial line of sight, for example, the axis 17, despite deviations of the camera housing 11 from the axis, as depicted in FIGURE 2. Thus, when the housing is tilted to an angle $\theta$ with respect to the original line of sight axis, the lens 18 is maintained in alignment with the axis by virtue of the gyro, while the lens 19 and the objective lens 12, which are fixedly secured to the housing, are oriented at an angle $\theta$ with respect to the axis.

From the foregoing, it will be appreciated that the mating rotatable lenses generate a prism having an angle $\theta$ equal to the deviation of the housing with respect to the line of sight axis, such a prism being depicted in FIGURE 2. The angle of deflection of light, $\phi$, in a thin prism is given by: $\phi=(n-1)\alpha$, where $n$ is the index of refraction of light through the prism, and $\alpha$ is the prism wedge angle. Inasmuch as the prism angle, $\alpha$, is $\theta$ in the prism generated by the lenses, the foregoing formula then reduces to: $\phi=(n-1)\theta$. Since the lenses have an index of refraction of two, $n=2$ may be substituted in the foregoing equation, whereupon $\phi$ is seen to equal $\theta$. If the direction of deflection of the prism is arranged to be the same as the direction of angular deviation of the camera housing, the rays of light deflected by the prism enter the objective lens parallel to its axis. Accordingly, the objective lens focuses the rays at the same point 24 on the film gate as that for which the rays were focused when the optical housing was aligned with the line of sight axis. Although FIGURE 2 depicts the compound lens compensating a housing deviation in a horizontal plane, it will be appreciated that a similar compensation occurs for housing deviations in a vertical plane, as well as vector combinations thereof. Thus, the images are brought to focus at the same relative positions of the film positioned in the film gate regardless of the small deviation angles $\theta$ of the housing from a line of sight.

Although the above demonstrates the general principles of the stabilized optical system of the present invention, an index of refraction of $n=2$ is difficult to obtain in actual practice. Accordingly, in actual practice the stabilized compound lens is usually formed as a pair of doublets, each defined by mating, relatively rotatable, plano-concave and plano-convex lens elements. Each pair of doublets is arranged in the manner hereinbefore described to generate a prism upon deviations of the camera housing from the original line of sight axis. In this case, the total deflection of light through the pair of prisms generated is arranged to be equal to the housing deviation $\theta$. Thus, with both doublets of the same index of refraction ($n=1.5$), it will be seen from the foregoing equation that the light rays are deflected through half of the housing deviation angle in passing through each of the pair of prisms generated such that deflection angles of the two prisms add up to the angular deviations of the housing. It will, of course, be appreciated that the indices of refraction of the two doublets may be respectively of different values, it being only necessary that the deflection angles of the respective prisms generated by the doublets add up to a total deflection angle which is equal to the housing deviations. As an alternative to the practical arrangement of two plano-concave, plano-convex doublets, just mentioned, a single doublet defined by a double concave and a double convex lens having an index of refraction of 1.5 may be employed to provide a deflection angle equal to the angular deviations of the housing from the line of sight.

Figure 3:
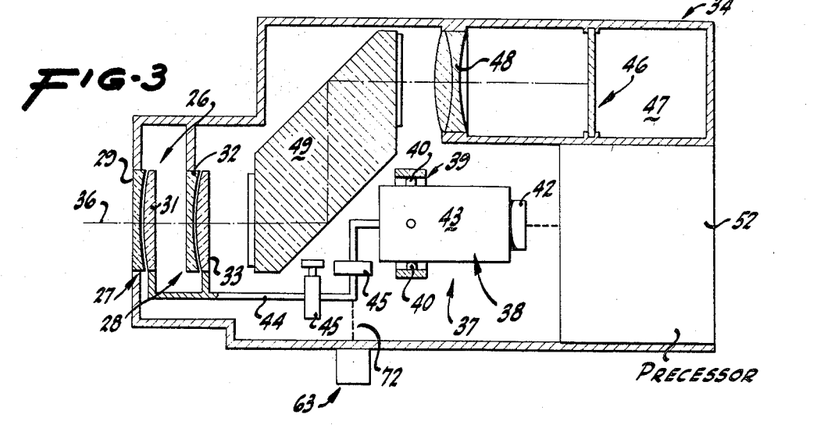
FIGURE 3 is a plan view with portions broken away of a camera with a practical stabilized optical system incorporated therein.
Figures 4, 5:
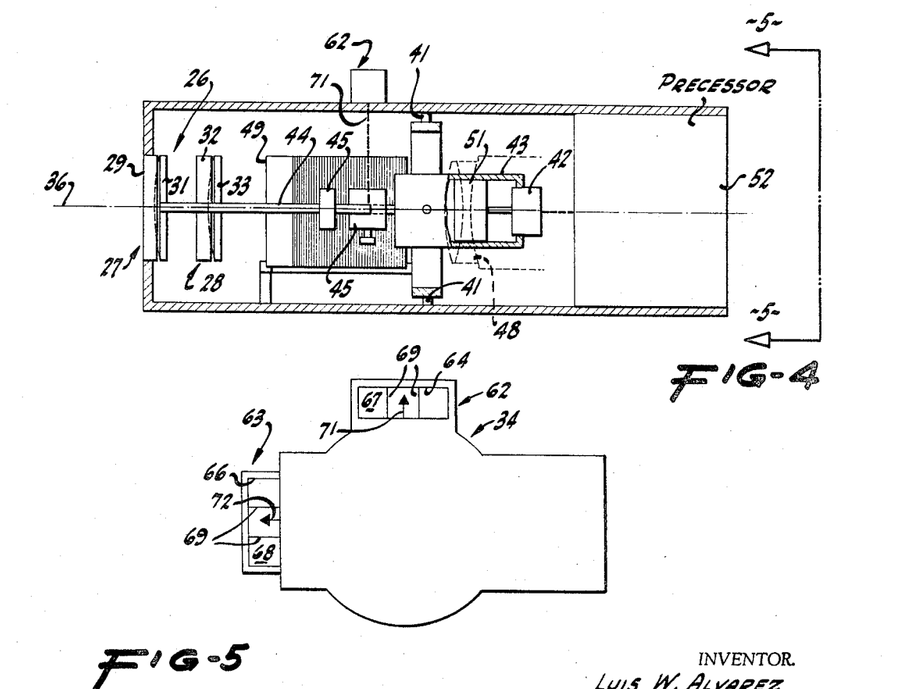
FIGURE 4 is an elevation view with portions broken away of the camera of FIGURE 3.
FIGURE 5 is an end view taken at line 5—5 of FIGURE 4.

Considering now the stabilized optics of the present invention in greater detail with respect to a practical embodiment of a movie camera, and referring to FIGURES 3 and 4, the camera will be seen to be generally in accordance with the considerations discussed hereinbefore. The camera includes an image stabilizing compound lens 26 which preferably comprises a pair of doublets 27 and 28 respectively formed by plano-concave and plano-convex lens elements 29 and 31 and by plano-concave and plano-convex lens elements 32 and 33, the curved surfaces of the lens elements 29 and 31 and of lens elements 32 and 33 being disposed in mating rotatable relation to each other. Lens elements 29 and 32 are fixedly secured within the housing 34 of the camera in coaxial alignment with its optical axis 36. The lens elements 31 and 33 are coupled to a gyro stabilizer 37 carried within the camera housing. The gyro stabilizer includes a gyroscope 38 mounted within the camera housing by means of gimbals 39 including horizontal axis pivots 40 and vertical axis pivots 41, the axes of which intersect the optical axis. The intersection, or center of the gimbals, is necessarily positioned at the center of curvature of the mating surfaces of the lens elements of the respective doublets. The gyro includes a rotor 42 rotatably mounted within a housing 43 which is, in turn, supported by the gimbals. The rotary axis of the rotor is coaxial with respect to the lens elements, and these lens elements are secured to an arm 44 which is secured to the gyro housing in parallel relation to the rotor axis. The system of the gyro, arm, and lens elements is balanced so that the gyro is free, i.e., no pendulous torques act no matter how the gyro is oriented, as by means of counter weights 45 selectively movable along the arm to balancing positions.

With the stabilized optical system of the camera, as just described, rotation of the rotor 42 causes the gyro 38 to resist movement from its spatial orientation and, accordingly, the lens elements secured thereto are maintained in a fixed spatial direction by the gyro. When the camera housing is deviated from an original direction of alignment with the line of sight axis 36, the lens elements attached to the housing are, accordingly, moved with respect to the lens elements maintained in alignment with the line of sight axis by the gyro. Accordingly, the lens elements of the doublets 27 and 28 generate prisms in the manner noted hereinbefore, and these prisms deflect the line of sight light rays through the proper angle so as to stabilize the image against such deviation. Thus, although the motion compensating lens has been hereinbefore termed a compound lens by virtue of its being comprised of a plurality of lenses, functionally there is provided a compound variable prism.

It is to be noted that inasmuch as the gyro stabilizer 37 is disposed on the optical axis of the camera, the gyro stabilizer may interfere with the proper positioning of a film gate in the instrument. This is readily taken care of in the illustrated embodiment by disposing a film gate 46 in a laterally offset portion 47 of the camera housing which parallels the optical axis. An objective lens 48 is mounted within housing portion 47 in coaxial alignment with the film gate. In addition, a double reflecting prism 49 (or its double mirror optical equivalent) extends between the portion of the housing containing the stabilized lens, and housing portion 47. This prism has parallel inclined 45° reflecting surfaces respectively centrally intersected by the optical axis and by the axis of the objective lens and film gate. Thus, the prism reflects light rays received from the stabilized lens into alignment with the objective lens and film gate axis. Although these elements are physically offset from the optical axis, they function just as if they are aligned with the optical axis, and the image is stabilized at the film gate.

Considering now the gyro stabilizer 37 in greater detail, it is to be noted that the gyro 38 thereof may be driven by a variety of motive means. A pull cord actuated gear drive, an air motor, or the like, may for example, be coupled in driving relation to the rotor to power rotation thereof. Preferably, however, an electric motor 51 is provided for this purpose with the motor being mounted within the gyro housing and shaft-connected to the rotor. This motor is preferably battery energized for purposes of portability.

Figure 6:
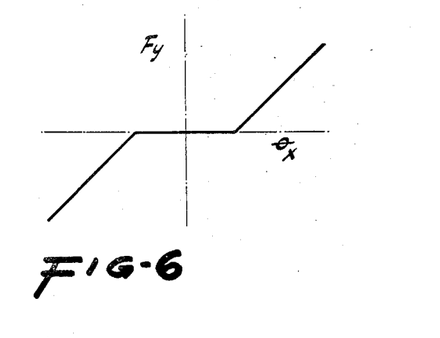
FIGURES 6 and 7 are graphs of the precession force characteristics of the gyro stabilizer employed in the camera as arranged to permit panning thereof while at the same time compensating the camera against small angle deviations thereof from a desired line of sight.
Figure 7:
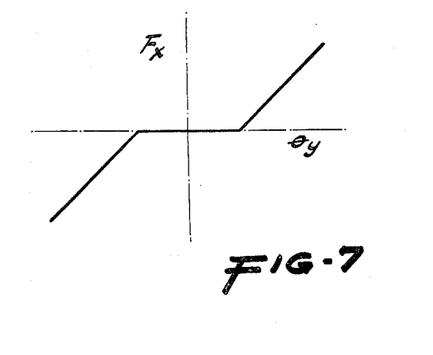

It is particularly important to note that the gyro stabilizer 38 in addition to compensating against accidental movement of the optical housing 34 and optical axis over a narrow range of small angle deviations from the line of sight, must additionally be capable of moving its associated lenses 31 and 33 at about the same rate and in the same direction as the optical housing is moved during intended sustained movement thereof in a given direction in order to accommodate panning of the camera. Accidental motion of the camera as arises, for example, from unsteadiness in the hand-holding thereof is generally limited to a range of the order of ±.01 radians except when the user is in an extreme environment, such as a jeep or a helicopter. Within this range, the gyro stabilizer 38 maintains its associated lenses 31 and 33 in alignment with an original line of sight direction to stabilize the image in the manner hereinbefore described. However, outside of this range of angles which arise during accidental movements of the housing the lenses associated with the gyro stabilizer must no longer be "locked" in position, for then the line of sight could not be panned even though the camera housing is panned. Accordingly, the gyro stabilizer includes provisions for precessing the gyro to follow the camera housing deviations beyond a predetermined range of small angles. To attain this condition, the stabilizer is provided with a precessor 52 in operative association with the gyro which is arranged to precess the gyro at approximately the same rate and through the same angle as the camera housing is moved for angles of deviation in excess of the limits of the range of small angle deviations. Inasmuch as precession of a gyro proceeds in directions at right angles to the directions of forces applied thereto, the precessor is arranged to apply forces in the horizontal, or $x$ direction, when the camera housing is deviated vertically from the line of sight axis (viz, in the $y$ direction) through angles in excess of the predetermined small angle range. Conversely, the precessor applies forces to the gyro in the vertical, or $y$ direction, when the camera housing is deviated from the line of sight axis in the horizontal, or $x$ direction. Furthermore, since the precessional velocity of a gyro is in direct proportion to the torque applied thereto, the forces imparted to the gyro by the precessor increasing at the same rate as does the angular deviation of the housing. The force characteristics of the precessor are as depicted by the curves of FIGURES 6 and 7. As noted in FIGURE 6, the curve of the precessor force in the $y$ direction, $F_y$, versus housing angular deviation in the $x$ direction, $\theta_x$, includes a central flat region of zero force which is centered wtih respect to zero deviation. The curve further includes upwardly and downwardly inclined regions of substantially uniform slope which extend from the opposite ends of the flat central region. Thus, within the limits of the flat central region, the precessing force is zero and, accordingly, the gyro continues to point in the same direction irrespective of the small angular displacements $\theta_x$ of the housing in the $x$ direction. Outside of the flat central region, increasing angular deviations of the camera housing produce uniformly increasing precessing forces $F_y$ in the $y$ direction which causes the gyro to precess in the $x$ direction at substantially the same angular rate as the camera housing is displaced in the $x$ direction. Similarly, the curve of the gyro precessing force in the $x$ direction, $F_x$, versus housing displacement in the $y$ direction, $\theta_y$, includes a flat central region of zero precessing force which is centered with respect to zero angular displacement of the camera housing in the $y$ direction. Inclined regions of substantially uniform slope extend from the opposite ends of the flat region. Accordingly, for small angle displacements $\theta_y$ of the camera housing in the $y$ direction within the limits of the flat central region of the curve, no precessing force $F_x$ in the $x$ direction is applied to the gyro. Accordingly, the gyro continuously points in the same direction. When the camera housing is panned up or down in the $y$ direction and the deviation angle $\theta_y$ hence is beyond the limits of the flat central region, precessing forces in the $x$ direction, $F_x$, are generated which cause the gyro to precess in the $y$ direction at substantially the same turning rate as the camera housing. Although the central regions of the precessor characteristics depicted in FIGURES 6 and 7 are absolutely flat and the characteristics include sharp discontinuities in slope at the transitions between the flat regions and the inclined regions, some departure from these specific characteristics can be tolerated and, in fact, exists in actual practice. For example, transition in slope between the inclined and flat regions of the characteristics may be gradual and the central regions not absolutely flat over their full extent. Accordingly, the precessor characteristic may have a "substantially" flat central region merging at its opposite end with inclined regions of increased slope.

Considering now the precessor 52 in greater detail as to preferred structure by which the precessing force curves of FIGURES 6 and 7 are provided, it is to be noted that the precessor must generate precessing forces at right angles to the desired direction of precession without the simultaneous generation of force components which are in the desired direction of precession. If the precession forces are not directed only at right angles to the desired direction of precession, the gyro will precess in directions at right angles to the desired direction simultaneously with its precession in the desired direction, with the result that the gyro may go into violent free oscillation. Various types of precessors may be provided and one basic type of precessor comprises means for applying a frictional drag to the gyro rotor in purely the $x$ or $y$ direction when the rotor is displaced beyond a predetermined range of small angle deviations in the $y$ or $x$ directions, respectively. It is particularly important that the frictional drag be applied as near to the rotor axis as possible, and as far from the center of the gimbals 39 as possible. In this regard, it will be appreciated that the torque acting to slow the gyro rotor due to a drag force thereon is proportional to the distance or radius of the surface upon which the force acts from the center of the gimbals. Thus, by establishing precessional forces which act on the gyro rotor close to its axis and at a relatively large radius from the gimbals center, a relatively large precessional effect is provided with negligible slowing of the gyro rotor.

Figure 8:
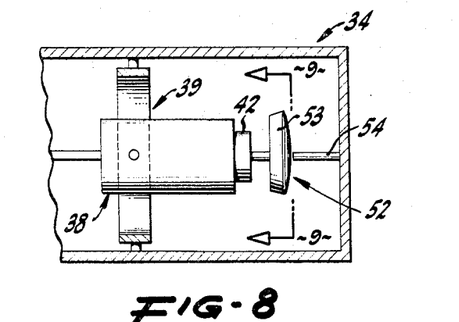
FIGURE 8 is a fragmentary elevation view of the camera with portions broken away, illustrating one form of precessor which may be employed in the gyro stabilizer thereof.
Figure 9:
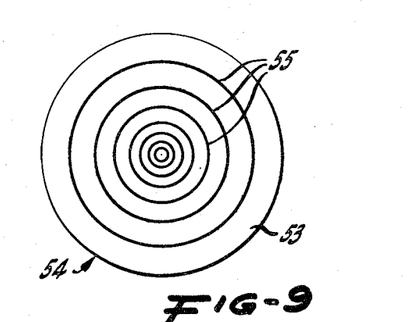
FIGURE 9 is a view taken at line 9—9 of FIGURE 8.

Referring now to FIGURES 8 and 9, there will be seen to be provided one form of frictional drag precessor wherein the frictional drag precessing forces are created by magnetic eddy currents. As shown in the figures, a segmental spherical member 53 of electrically conducting material, such as copper, is coaxially secured to the gyro rotor 42. Preferably, the center of curvature of the outer surface of the spherical member is disposed at the center of the gimbals. Although the member is herein provided as a separate extension of the rotor, it will be appreciated that the outer spherical surface of the member may be equivalently defined by the outer transverse face of the rotor per se, where such face is a spherical configuration and the rotor is formed of electrically conducting material. The precessor further includes a magnet 54 which may be a permanent magnet or an electromagnet as desired. This magnet is rigidly secured to the instrument housing 34 and projects therefrom in coaxial alignment with the optical axis into close proximity with the member 53. Thus, the magnetic field generated by the magnet induces eddy currents in the member as it is rotated through the magnetic field. The eddy currents are induced in the member 53 in the region thereof which is immediately adjacent the magnet 54 and these eddy currents produce drag forces which are tangential to the member and oppose its rotation. By virtue of the curvature of the outer surface of the member, the gyro may be rotated in the $x$ and $y$ directions relative to the gimbals center and the gap length between the magnet and the outer surface of the member is maintained constant such that the strength of the magnetic field acting at any point on the surface of the member is the same. The eddy current drag force in addition to being a function of the strength of the magnetic field, is also a direct function of the tangential velocity of the region of the surface in which the eddy currents are induced, and therefore the radius of the region of the member which is adjacent the tip of the magnet. Thus, when the instrument housing is displaced in the vertical, or $y$ direction, and the tip of the magnet is correspondingly displaced relative to the member in the $y$ direction, the eddy current drag force is tangential to the region of the member adjacent the tip of the magnet and is therefore in the $x$ direction. Such a force precesses the gyro in the $y$ direction and inasmuch as the force has a magnitude which uniformly increases with respect to the radius of the member at which the force acts, the precessional velocity of the gyro uniformly increases with respect to the relative displacement between the member and the magnet and therefore with the deviations of the instrument housing from the line of sight axis. Similarly, when the housing is displaced in the $x$ direction, the tangential drag force acting on the member is in the $y$ direction, likewise, since the magnitude of the drag force is dependent upon the relative displacement between the member and the tip of the magnet, the force increases for increasing deviation of the housing in the $x$ direction and, accordingly, the gyro precesses in the $x$ direction at a rate which is uniformly increasing with respect to increasing housing deviations. The direction of rotor rotation is selected such that the eddy current drag forces are appropriately directed to precess the gyro in the same direction as that in which the camera housing is turned. The rate of gyro precession due to the eddy current drag forces will, by servo action, closely approximate the turning rate of the camera housing and will have a substantially flat zero precession rate over a range of small angle deviations of the housing, by appropriate adjustment of the geometry of the rotor-magnet system.

In this regard, it is desirable that the conductivity of member 53 be such that the eddy current drag forces with respect to housing deviation have a characteristic of the type depicted by FIGURES 6 and 7. Such adjustment of the conductivity may be provided by slotting the outer surface of the member in the manner depicted in FIGURE 9. The outer surface of the member 53 is formed with a plurality of concentric slots or grooves 55 which are very closely spaced in a central region of small diameter and which have progressively increased radial spacing outwardly from the central region. These grooves reduce the surface conductivity of the member in accordance with the radial spacing therebetween. Thus, in the central region of the member the surface conductivity is extremely low and in conjunction with the small radii contained within the central region provides eddy current drag forces which are substantially equal to zero. Through appropriate selection of the radial density of the grooves in the region of the member outwardly from its central region, the magnitudes of the eddy current drag forces acting therein may be substantially conformed to the characteristic curves of FIGURES 6 and 7 such that the precession of the gyroscope 38 to close approximation follows the turning of the camera housing 34. Within the central region of the member, of substantially zero eddy current drag force, the gyro is not precessed and, accordingly, continuously points in the line of sight direction.

Figure 10:
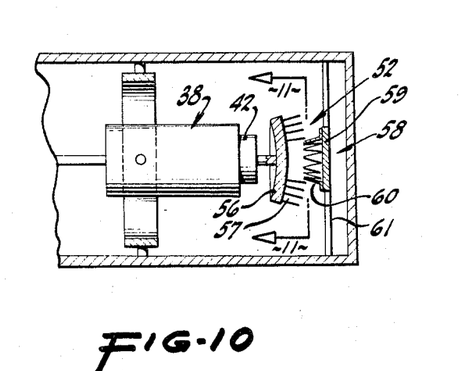
FIGURE 10 is a view similar to that of FIGURE 8, but depicting a modified form of precessor.
Figure 11:
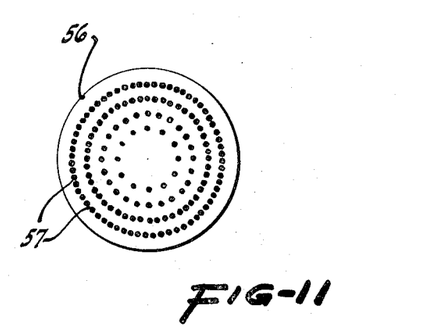
FIGURE 11 is a view taken at line 11—11 of FIGURE 10.

FIGURES 10 and 11 depict an alternative arrangement of precessor of the drag force variety which may be employed to precess the gyro 38 in accordance with the desired precession characteristics illustrated in FIGURES 5 and 6. In the present arrangement, precession drag forces are provided by contact between pins projecting from the gyro rotor and spring members projecting from the housing of the camera. The illustrated structure includes a segmental spherical member 56 coaxially secured to the rotor 42 of the gyro 38. Preferably this member has a radius of curvature which is centered at the gimbals center. A plurality of pins 57 project from the exterior face of the member in normal relation thereto so as to be radially disposed with respect to the gimbals center. It is particularly important to note that in a central region of small radius of the member, no pins are provided, whereas outside of the central region the density of the pins progressively increases with radius. The precessor further includes a drag member 58 secured in fixed coaxial relation to the camera housing 34 in close spaced relation to the exterior face of the member 56 carried by the gyro rotor. The fixed member includes a plurality of projections which are preferably radially disposed with respect to the gimbals center and which have tips defining a circle of smaller radius than the central region of the face of the member. In addition, the projections extend sufficiently in the direction of member that their tip portions are engageable with the pins 57 upon angular displacement of the gyro 38 through predetermined angles to the axis of the camera housing. Accordingly, for small angle displacements of the housing less than the predetermined angles, the tips of the projections of the fixed member are disposed within the central region of the member 56 devoid of pins 57 and no contact occurs therebetween and no precessing drag forces are imparted to the gyro. The gyro, accordingly, maintains its alignment with the line of sight direction. When the camera housing is turned to angles in excess of the predetermined angular limits, such as in the intended panning of the camera, the projections of the fixed member 58 engage the rotating pins 57 of the member 56 and hence impart drag forces to the gyro rotor in their engagement. These drag forces are tangential to the member and, accordingly, are directed at right angles to the direction of movement of the housing such that they precess the gyro in the direction of housing movement. Inasmuch as the density of the pins increases with respect to radius, and an increasing number of pins confact the projections of the fixed member per unit of time as the angular displacement of the housing increases the precessing drag forces are correspondingly increased to in turn increase the precessional velocity of the gyro in correspondence with the angular displacement of the camera housing. Through appropriate selection of the variation of pin density, a precessing characteristic of the type depicted in FIGURES 6 and 7 is obtained. Numerous alternatives are, of course, possible in the provision of the fixed member projections, however, the design of such a member must be such as to avoid the generation of force components in the direction of housing movement simultaneously with the generation of the desired precessing forces normal to the direction of housing movement. Otherwise, the gyro undergoes violent free oscillations, as noted hereinbefore. The fixed member projections are therefore arranged to generate truly tangential forces in their contact with the pins. One possible form of fixed member for generating truly tangential drag forces comprises a plurality of circumferential spaced bristles projecting from a backing member mounted in coaxial relation to the optical axis and radially disposed with respect to the gimbals center. More preferably, the fixed member 58 is provided as a circular disc 59 of spring metal or the like having a plurality of annular serrations 60 coaxial with the gimbals center. The disc is secured within the camera housing in alignment with the optical axis, preferably by a spring metal support 61. The folded serrations 60 are tangential to the pins in their rotation such that purely tangential drag forces are generated.

Although the precessor 52 has been discussed hereinbefore primarily with reference to various drag force types of precessing means, it is to be noted that the precessor may as well be provided as a magnetic torquer. For example, errors in the alignment of the gyro 38 with respect to the optical axis can be variously detected, as by photoelectric means, arranged to generate error signals which are indicative of the alignment error. The error signal may be applied to electromagnets, or the like, disposed in quadrature at opposed vertical and horizontal positions with respect to a magnetic slug, for example, coaxially secured to the gyro housing 43. When an alignment error is detected, an electrical error signal is responsively applied to an appropriate one of the magnets which magnetically attracts the slug in a direction to precess the gyro compensatory to the detected alignment error. It will be appreciated, that with such an arrangement, no drag forces are applied to the gyro rotor 42 and there is consequently no deceleration thereof. Moreover, there is no chance to introduce torques which can set up free oscillations of the gyro.

It will be appreciated that in the use of a stabilized camera of the type just described, one cannot tell how well he is pointing, and where the pointing is sloppy the gyro may be inadvertently precessed. Accordingly, it is desirable that means be provided to alert the operator as to how well he is pointing, such that precessing of the gyro is only initiated when intended, as in panning. A variety of indicating means may, of course, be provided for this purpose, and one simple arrangement is depicted in FIGURE 5 for purely illustrative purposes. In this regard, projecting enclosures 62 and 63 including indicator windows 64 and 66 are respectively provided at the top and one side of the optical housing 34. Gauge panels 67 and 68 are provided within the enclosures in facing relation to the windows 64 and 66 so as to be observable therethrough by an operator holding the camera. The panels are secured in fixed relation to the housing 34 and may be advantageously provided with suitable guide lines, as indicated at 69, to set off the predetermined narrow angular range of accidental movement. Indicator needles 71 and 72, or the like, are fixedly secured to the gyro system, e.g., to the arm 44 thereof, and respectively project vertically and horizontally therefrom at positions on the axis of the gyro rotor 42, as shown in FIGURES 3 and 4. The needles 71 and 72 extend into the enclosures 62 and 63, respectively, between the windows and gauge panels thereof, and may thus be observed through the windows as being positioned in front of the gauge panels. The needles 71 and 72 are free to move within the enclosures, and their positions relative to the gauge panels 67 and 68 correspond to the horizontal and vertical positions, respectively, of the lens elements 31 and 33, secured to the gyro, relative to the lens elements 29 and 32, affixed to the camera housing. When the needles are within the spaces between the guide lines 69 of the respective gauge panels, pointing of the camera is satisfactory and the gyro is not precessed. When either, or both, of the needles are out of the spaces between the guide lines, pointing of the camera is sloppy and the gyro is precessing. It will be thus appreciated that by observing the positions of the needles with respect to the gauge panels, the operator is at all times aware of how well he is pointing, and inadvertent precessing of the gyro is thereby prevented.

The stabilized optics of the present invention described hereinbefore with respect to movie cameras may also be advantageously employed in still cameras to provide photographs of improved quality. In this regard, stabilized lens systems of the type described hereinbefore may be employed in a similar manner in still cameras, but with the gyro precessor excluded. The stabilized lens system then automatically deflects incoming light rays through the same angles as the camera housing is deviated from an intended line of sight. Accidental movement of the camera housing is thus compensated and a stabilized image is produced at the film plane. Thus, a clear-cut image is produced even when slow film is utilized in the camera. Moreover, clear-cut time exposures can be taken without the usual requirement of a stable support, such as a tripod, image stabilization being automatically effected by the stabilized lens system.

Although the stabilized optics of the present invention have been discussed hereinbefore in detail with respect to cameras and the like wherein the image is recorded or observed at a fixed focal plane, the principles of the invention apply equally as well to other types of optical instruments such as field glasses, telescopes, and the like, wherein an image field of view must be considered, for the eye of an observer is displaced from the focal plane of the instrument and, moreover, is movable with respect to the instrument housing. In this latter type of optical instrument, the image stabilization, as discussed relative to cameras, while greatly improving the siutation still does not provide complete compensation for small angle movements of the instrument housing, and an additional small correction which is inversely proportional to the magnification of the over-all optical system may be advantageously introduced. More particularly, a stabilized lens system as employed in an optical instrument which has an associated image field of view preferably undercompensates or overcompensates, depending upon whether an erect or inverted image, respectively, is produced in order to provide complete image stabilization.

Figure 12:
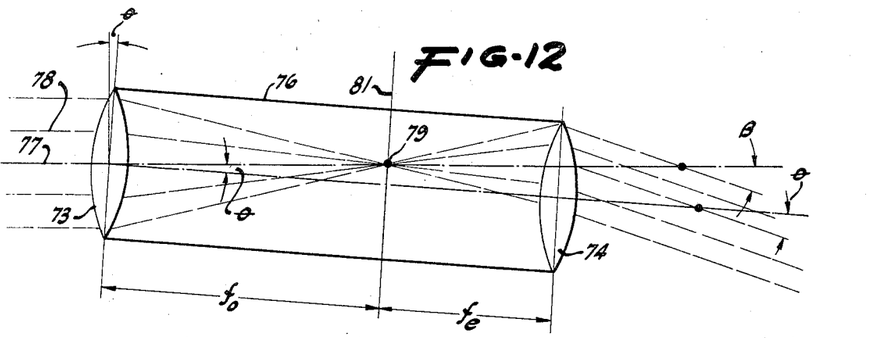
FIGURE 12 is a schematic illustration of an inverting telescope, or equivalent optical instrument having a movable image plane, tilted at an angle to a desired line of sight.
Figure 13:
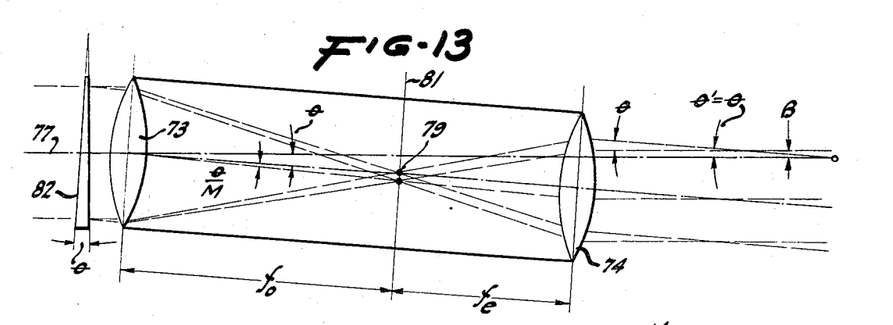
FIGURE 13 is a schematic illustration of the inverting telescope of FIGURE 12, but including a stabilized lens system in accordance with the present invention as arranged to provide an image fixed in space for viewing by an observer despite the angular deviation of the telescope from a desired line of sight.

The foregoing will be better understood upon consideration of the typical inverting telescope depicted in FIGURES 12 and 13. As shown therein, the telescope includes an objective lens 73 and an eyepiece or ocular 74 mounted at opposite ends of an optical housing 76. The housing is shown to be accidentally tilted at an angle $\theta$ to a line of sight axis 77, and light rays 78 entering parallel to the line of sight axis are brought to focus at an image point 79 on a focal plane 81 displaced from the objective lens by its focal length, $f_o$. It is to be noted that the point image is displaced from the axis the the telescope and this is one point of the real image produced at the focal plane which becomes the object of the eyepiece. The eyepiece 74 is displaced from the focal plane 81 by a longitudinal distance equal to its focal length, $f_e$, and the light rays diverge from the image point and are incident upon the eyepiece at angles which are somewhat different than they would be if the telescope were aligned with the line of sight axis and the image point were located at the optical axis of the instrument. The exit rays which emerge from the eyepiece parallel to each other for viewing by the eye of an observer, are consequently inclined at an angle $\theta'$ with respect to the optical axis of the telescope, and at an angle $\beta$ with respect to the line of sight axis 77. The exit rays are thus not parallel to these axes as they would be of the telescope were aligned with the line of sight axis. In this regard, the angle $\theta'$ is equal to $M\theta$, where M is the magnification power of the telescope, which is given by: $M=f_o/f_e$. In addition, the angle of the exit rays with respect to the line of sight axis 77 is given by: $\beta=\theta+\theta'=\theta(1+M)$. This is the angle an observer would see the image turn through in movements of the telescope as indicated. It will be found that in the provision of a stabilized lens system for the illustrated telescope, or equivalent instrument, that a compensating deflection angle, $\theta$, equal to the angular swing of the instrument, as employed in a camera to provide complete stabilization, very nearly stabilizes the image produced in the observer's field of view. The observed image does, however, swing through a small angle in the observer's field of view and one can do better and provide complete stabilization by eliminating this small angle.

The foregoing will be better understood upon reference to FIGURE 13, wherein the telescope is illustrated as being tilted at an angle $\theta$ to the line of sight axis 77, as in the case illustrated in FIGURE 12, but a stabilized lens in accordance with the present invention is disposed in front of the objective lens 73 to generate a prism 82 having an angle $\theta$ equal to the deviation of the telescope housing 76 from the line of sight axis. Where the prism is arranged to produce a deflection equal to the angle $\theta$, the deflected rays are incident upon the objective lens 73 parallel to its axis and emerge from the eyepiece 74 parallel to the instrument axis. Inasmuch as the optical axis of the instrument is at an angle $\theta$ to the line of sight axis, the angle $\beta$ of the exit rays with respect to the line of sight axis 77 is likewise $\theta$. The observer's field of view and the image thus move through the angle $\theta$ as compared to the angle $\theta(1+M)$ of an uncompensated instrument. This, of course, represents a material improvement over the uncompensated instrument. More particularly, if the magnification power M of the telescope were 20 and the accidental deviation of the telescope housing 76 were 0.5 degree, the image would swing through an angle of only 0.5 degree as compared to 10.5 degrees in the uncompensated case. This stabilizing effect will be quite apparent upon comparing FIGURES 12 and 13. Even this small angle $\theta$ of remaining image movement, however, may be stabilized through the incorporation of a small additional compensation $\theta/M$ in the prism 82 generated by the stabilized lenses. In the present instance of an inverting telescope, overcompensation of the prism by the amount $\theta/M$ provides additional stabilization of the image of $$M \cdot \frac{\theta}{M} = \theta$$

Accordingly, the prism should have a deflection angle equal to $$\theta\left(1+\frac{1}{M}\right)$$

in order to provide an angle $\beta$ between the exit rays from the eyepiece 74 and the line of sight axis 77 of zero. Multiplying this prism deflection angle by the magnification, M, i.e., $$M\theta\left(1+\frac{1}{M}\right)$$

an angular compensation of $M\theta+\theta$ is produced in the observer's field of view, which is precisely equal to the angular swing of the image from an uncompensated telescope and, accordingly, fully compensates the same. It may be similarly shown that for an erecting optical instrument, the prism generated by the stabilized optical system must undercompensate by an angle $\theta/M$ in order that the exit rays from the eyepiece will be exactly parallel to the line of sight axis and the image will be exactly stabilized in the observer's field of view. The general equation for the prism deflection angle, $\phi$, required to stabilize an image against deviations of an optical instrument having an associated field of view is accordingly given by:

$$\phi=\theta\left(1\pm\frac{1}{M}\right)$$

The stabilized optical systems described hereinbefore may introduce aberrations, which under some circumstances can become intolerable in detracting from the quality of the image, even though the image is stabilized against transverse oscillations of the instrument from the line of sight axis. In this regard, the stabilized optical systems may introduce a type of coma aberration where the outer surfaces of the lens elements of the stabilizing pairs thereof are curved. The coma type aberrations are proportional to the square of the curvature of the outer surfaces of the lenses. Accordingly, where double concave and double convex lenses are employed in the stabilizing lens system, which as noted hereinbefore, represent one type of lens that might be employed, coma aberrations are produced in the image. For many applications, the coma type aberrations are tolerable, and in instances where they cannot be tolerated, they can be readily eliminated or minimized to a negligible extent by utilizing lenses which have flat or very nearly flat outer surfaces. In the various embodiments illustrated in the drawing, plano-concave and plano-convex lenses have been employed and, accordingly, the coma type aberrations need not be considered therein.

Another aberration to be considered in connection with the stabilized optical systems in accordance with the present invention is the chromatic blurring caused by the dispersion of light in the prisms generated by the pairs of lenses of the stabilized optical system. Where the optical instrument is of the magnifying type including an eyepiece, for example, telescopes, field glasses, and the like, the color blurring might become intolerable inasmuch as it is magnified by the power of the instrument. In this regard, it is fortunate that in practical stabilized high power telescopes, and the like, whenever the deflection angle and therefore the chromatic aberration of the system is high, the angular rate of the image is also high so the eye cannot notice the aberration in the rapidly moving image. The same favorable effect prevails in rapidly panned moving pictures. However, under other circumstances, such as in the viewing of a stationary object or slowly panned moving pictures, where the color blurring might become intolerable, the stabilized optical system can easily be made achromatic.

Figure 14:
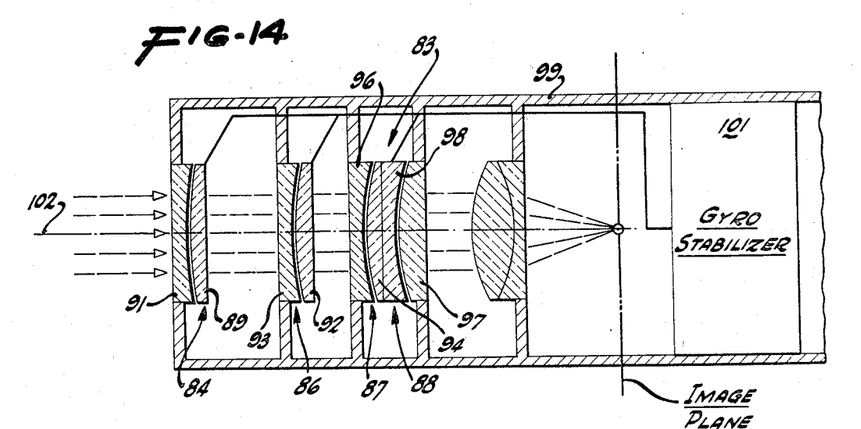
FIGURE 14 is a schematic illustration of a stabilized optical system in accordance with the present invention, including means for correcting chromatic aberrations in the lens system.
Figure 15:
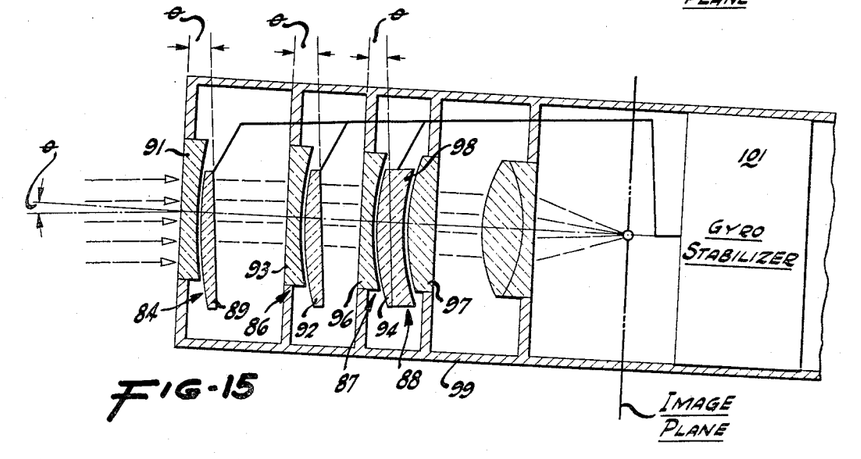
FIGURE 15 is a schematic illustration of the achromatic lens system of FIGURE 14, but with the instrument in which the lens system is incorporated tilted at an angle to a desired line of sight.

Considering now an acrromatic stabilized optical system in accordance with the present invention and referring to FIGURE 14, there is provided an achromatic compound lens 83 which comprises a plurality of pairs or doublets 84, 86, 87 and 88. respectively, including plano-convex and plano-concave lenses 89 and 91, 92 and 93, 94 and 96, and 97 and 98. The respective lenses in each doublet are rotatable with respect to each other in the manner described hereinbefore and one lens of each doublet is secured in fixed relation to an optical housing 99 of the particular optical instruments, in coaxial alignment with the optical axis thereof. The other lenses of each doublet are stabilized by a gyro stabilizier 101, of the type described hereinbefore, which is carried by the housing. In the manner previously described, the gyro stabilizer maintains the lenses secured in fixed spatial alignment with an original line of sight axis 102 despite deviations $\theta$ of the housing from the original line of sight. Upon deviations of the housing from the line of sight axis, the lenses of the respective doublets generate prisms having the deviation angle $\theta$. The prisms are arranged such that the total deflection angle of light rays therethrough produces a stabilized image in accordance with the consideration hereinbefore advanced. More particularly, in the case of a camera or equivalent instrument where the image is to be stabilized at a fixed image plane within the housing, the total deflection angle of the respective doublets is equal to the housing deviation angle $\theta$. In the case of a telescope, field glasses, etc., having an associated field of view in which the image is to be stabilized, the total deflection angle of light rays through the respective doublets is modified by an additional compensation, $\theta/M$, and is given by the expression:

$$\theta\left(1\pm\frac{1}{M}\right)$$

Chromatic aberration is overcome in the compound lens by arranging the doublets 84, 86, and 87 to generate positive prisms and the doublet 88 to generate a negative prism. In this regard, the concave lenses 91, 93, and 96 of doublets 84, 86, and 88 are fixedly secured to the optical housing 99 while the convex lenses 89, 92, and 94 of these doublets are secured to the gyro stabilizer 101. However, the positive, or convex, lens 97 of doublet 88 is secured in fixed relation to the housing while the negative, or concave, lens 98 of this doublet is secured to the gyro stabilizer. Preferably, the convex lens 94 of doublet 87 and the concave lens 98 of doublet 88 are cemented together and secured as a unit to the gyro stabilizer. It is by virtue of this arrangement that the doublet 88 generates a prism of opposite sign to the prisms generated by the other doublets 84, 86, and 87 of the compound lens. Furthermore, the lenses of the doublets 84, 86, and 87 are formed of crown glass, while the lenses of the invert prism generating doublet 88 are formed of flint glass. Various crown and flint glasses may be selected for employment in the doublets of the compound lens to provide a total dispersion through the crown glass doublets which is equal to the dispersion through the flint glass doublet. More particularly, assuming that the crown glass doublets provide dispersions, $D_1, D_2 \ldots D_n$, while the flint glass doublet provides a dispersion, $D'$, such that $$D'=\Sigma D$$

then by virtue of the prism generated by the flint glass doublet being of inverse angle to the prisms generated by the crown glass doublets, the net dispersion through all the doublets of the compound lens is zero and such compound lens is hence achromatic, i.e., no chromatic aberrations are produced by the compound lens. Expressed in another manner, the condition for achromatization is given by the relation:

$$\Sigma\frac{\Delta_c}{\gamma_c}=\Sigma\frac{\Delta_f}{\gamma_f}$$

where: $\Delta_c$ is a measure of the deviation of the Fraunhofer D line in the respective crown glass doublets, $\Delta_f$ is a measure of the deviation of the D line in the respective flint glass doublets, $\gamma_c$ is the reciprocal of the dispersive power of the crown glasses of the respective doublets for two standard wavelengths such as the F and C Fraunhofer lines which are to be achromatized, $\gamma_f$ is the reciprocal of the dispersive power of the flint glasses of the respective flint glass doublets for the same two standard wavelengths; $\Delta_c=n_d-1$, where $n_d$ is the index of refraction of the D line of the particular crown glass employed in each doublet; $\Delta_f=n'_d-1$, where $n'_d$ is the index of refraction of the D line for the particular flint glass employed in each doublet;

$$\gamma_c=\frac{\Delta_c}{n_1-n_2}$$

where $n_1$ and $n_2$ are the indices of refraction of the crown glass of a given doublet for the two standard wavelengths being achromatized; and $$\gamma_f=\frac{\Delta_f}{n'_1-n'_2}$$

where $n'_1$ and $n'_2$ are the indices of refraction of the flint glass of a given doublet for the two standard wavelengths being achromatized. Thus, by selecting crown and flint glasses having characteristics satisfying the above equation, the compound lens is made achromatic.

It should be noted that the conditions for total deflection of the doublets of the compound lens commensurate with stabilization of the image against deviations of the housing from the line of sight axis, may be expressed in terms of the measures of deviations of the D line in the respective crown and flint glass doublets, i.e., in terms of $\Delta_c$ and $\Delta_f$ for the respective doublets. More particularly, considering image stabilization first in the instance of a camera, the total deflection $\phi_D$ of the D line through the compound lens is equal to the deviation angle $\theta$ of the instrument housing from the line of sight. Thus, taking the sum of the deflections through the individual prisms generated by the respective doublets, the foregoing expands to: $\Sigma\phi_c-\Sigma\phi_f=\theta$, $\phi_c$ being the deflection of the D line by each crown glass doublet, and $\phi_f$ being the deflection of the D line by each flint glass doublet. As noted hereinbefore, the deflection, $\phi$, of a thin prism in air is given by: $\phi=(n-1)\alpha$, where $n$ is the index of refraction of the prism for a particular wavelength and $\alpha$ is the prism angle. In the present instance, $\alpha=\theta$, and for the D line, $n_D-1=\Delta_c$, in the instance of the crown glass elements, and $n'_D-1=\Delta_f$, in the instance of the flint glass element. Accordingly, the equation for stabilization of the image noted above may be expanded as follows:

$$\Sigma\Delta_c\theta-\Sigma\Delta_f\theta=\theta$$

Dividing both sides of the equation by $\theta$, the equation reduces to: $\Sigma\Delta_c-\Sigma\Delta_f=1$, which is the condition for image stabilization which must be satisfied simultaneously with the equation for achromatization noted hereinbefore for a camera. In the instance of a telescope, field glasses, or other optical instruments having an associated field of view, the foregoing equation is expanded to include the additional compensation $\theta/M$, and for these instruments the equation hence becomes:

$$\Sigma\Delta_c-\Sigma\Delta_f=1\pm\frac{1}{M}$$

The equations for achromaaization and image stabilization noted above pertain to situations where the doublets of the compound lens are comprised of plano-concave and plano-convex lenses. It should be noted that the equations still hold where the outer faces of the doublets have a slight curvature, provided small correction factors $\delta_c$ and $\delta_f$ are added to the equation to account for the fact that the outside surfaces of the doublets are not planar. These correction factors may be evaluated in terms of the common radius of curvature of the meshing surfaces of each doublet. This is accomplished by noting that $$\delta_c=\frac{R_c}{\rho_c} \text{ and } \delta_f=\frac{R_f}{\rho_f}$$

$R_c$ and $R_f$ being respectively the radii of curvature of the meshing surfaces of the respective crown glass doublets and flint doublets, and $\rho_c$ and $\rho_f$ being the very large radii of curvature of the outer surfaces of the crown glass and flint glass doublets, respectively. Taking these correction factors into account, the condition for achromaticity becomes $$\Sigma\frac{\Delta_c(1-\delta_c)}{\gamma_c}=\Sigma\frac{\Delta_f(1+\delta_f)}{\gamma_f}$$

Likewise, the condition for stabilization of the image becomes: $\Sigma \Delta_c(1+\delta_c) - \Sigma \Delta_f(1+\delta_f) = 1$, in the case of a camera, and $$\Sigma \Delta_c(1+\delta_c) - \Sigma \Delta_f(1+\delta_f) = 1 \pm \frac{1}{M}$$

in the case of a optical instrument having an image field of view.

Considering now one specific example of an image stabilizing achromatic compound lens which may be designed in accordance with the foregoing considerations, such lens may advantageously employ Schott Crown, SSK 9, as the crown glass doublets of the lens. SSK 9 has constants of $$\Delta_c = 0.62, \text{ and } \frac{\Delta_c}{\gamma_c} = 1.245 \times 10^{-2}$$

and therefore assuming the use of three identical crown glass doublets in the design of an achromatic lens for a 20-power telescope, or the like, the equation for zero net dispersion becomes:

$$3.733 \times 10^{-2}(1+\delta_c) = \frac{\Delta_f(1+\delta_f)}{\gamma_f}$$

To satisfy this equation, a flint glass must be found having a constant $\Delta_f/\gamma_f$ which is substantially equal to $3.733 \times 10^{-2}$. It will be found that Kodak Flint F has a constant $\Delta_f/\gamma_f$ which is equal to $3.74 \times 10^{-2}$, and thus relatively close to the constant $$3\frac{\Delta_c}{\gamma_c} = 3.733 \times 10^{-2}$$

As a further criterion in the selection of suitable crown and flint glasses for employment in the compound lens, the correction factors $\delta_c$ and $\delta_f$ should be practicably no greater than 0.2 in order that the comma aberration of the lens will be negligible. Inasmuch as the constants of the selected crown and flint glasses substantially satisfy the dispersion equation, the correction factors $\delta_c$ and $\delta_f$ requisite to complete satisfaction thereof will be relatively small. However, the stabilization equation:

$$\Sigma \Delta_c(1+\delta_c) - \Sigma \Delta_f(1+\delta_f) = 1 \pm \frac{1}{M}$$

must be simultaneously satisfied with correction factors $\delta_f$ and $\delta_c$ of relatively small values less than 0.2. Kodak Flint F has a constant $\Delta_f = 0.995$, and it will be found that upon substituting this value, as well as the value $\Delta_c = 0.62$ for the crown glass elements, into the stabilization equation, that the correction factors $\delta_c$ and $\delta_f$ necessary to satisfy same will be of negligibly small value. More particularly, we have:

$$1.86(1+\delta_c) - .995(1+\delta_f) = 0.95$$

Through the simultaneous solution of this equation and the dispersion equation, $$3.733 \times 10^{-2}(1+\delta_c) = 3.75 \times 10^{-2}(1+\delta_f)$$

$\delta_f$ is calculated as being 0.089 and $\delta_c$ is 0.091. Thus, the correction factors are of substantially negligible order for a compound lens comprising three crown glass doublets of Schott Crown SSK 9 and one flint glass doublet of Kodak Flint F which may be employed in a 20-power erecting telescope, or the like. Such a lens provides image stabilization with negligible chromatic aberration, as well as negligible coma aberration. It will be appreciated that various other specific systems may be designed in the manner set forth hereinbefore using other combinations of glasses and numbers of doublets to provide achromatization and image stabilization for substantially any desired magnification power of a given optical instrument.

While the present invention has been described hereinbefore and illustrated in the drawings with respect to a number of specific embodiments thereof, it will be appreciated that numerous variations and modifications are possible therein without departing from the spirit and scope of the invention, and thus it is not intended to limit the invention except by the terms of the appended claims.

What is claimed is:

1. An accidental-motion compensator for an optical instrument having a housing with an optical system therein comprising at least one doublet lens including primary and secondary lens elements in rotatable-mating relation to each other, means mounting the primary lens element of each doublet lens in fixed relation to said housing in alignment with an optic axis of said optical system, and a free gyroscope disposed within said housing in connection with the secondary lens element of each doublet lens and together therewith balanced about two mutually perpendicular pivot axes intersecting said optic axis for maintaining the secondary lens element of each doublet lens in fixed angular orientation with respect to an original line-of-sight of said optical system despite accidental motion of said housing.

2. The accidental-motion compensator of claim 1 further defined by the lens elements of each doublet lens defining a variable deflection doublet having deflection angles with magnitudes proportional to angular deviations of the optic axis from an original line-of-sight and the sum of the deflection angles of the doublet lenses being substantially equal to the angular deviation of the housing and optic axis from an original line-of-sight.

3. The accidental-motion compensator of claim 2 further defined by precessing means carried by said housing and operatively associated with said gyroscope for precessing the gyroscope in the same direction and at substantially the same rate as angular housing movements from an original line-of-sight for angular movement thereof in excess of a predetermined limited range of angular movement.

4. The accidental-motion compensator of claim 3 further defined by a plurality of doublet lenses with the dispersion of light through one portion of said plurality being equal and opposite to the dispersion of light through the remaining portion of said plurality to thereby achromatize the accidental-motion compensator.

5. The accidental-motion compensator of claim 3 further defined by an indicator operatively associated with the connected secondary lens of each doublet and gyroscope and with said housing for indicating angular orientation of housing and original line-of-sight.

6. The accidental-motion compensator of claim 1 further defined by the primary and secondary lenses of each doublet lens having a common center of curvature of the mating surfaces and the intersection of said two pivot axes being in line with the centers of curvature of said lenses.

7. The accidental-motion compensator of claim 2 wherein said optical system includes an objective and eyepiece and further defined by the combined deflection angles of the doublet lenses being equal to $$\theta\left(1 \pm \frac{1}{M}\right)$$

wherein $\theta$ is the angular deviation of the housing and optic axis from an original line-of-sight, M is the overall magnification of the optical system, and the plus sign is employed for an inverting system and the minus sign for an erecting system.

8. An accidental-motion compensator for an optical instrument having a housing with an optical system therein comprising at least one compound lens having a pair of lens elements with curved mating surfaces, means mounting one of the lens elements of each compound lens in fixed relation to said housing, a free gyroscope having a rotor and pivotally mounted in said housing about two mutually perpendicular axes, said gyroscope being connected to the other lens element of each compound lens and balanced therewith about said axes, and gyroscope precessing means including means defining a segmental spherical surface coaxial with the gyroscope rotor and having a center of curvature at the center of curvature of said compound lens, said precessing means having a plurality of pins projecting perpendicularly from said surface about a central circular region and increasing in number with increasing distance from said region, and said precessing means further comprising a circular drag member secured to said housing in fixed coaxial relation to the fixed lens element of each compound lens with said drag member having a plurality of resilient serrations for engaging said pins upon angular deviation of said housing beyond a predetermined angle from an original line-of-sight.

9. An accidental-motion compensator for an optical instrument having a housing with an optical system therein comprising at least one compound lens having a pair of lens elements with curved mating surfaces, means mounting one of the lens elements of each compound lens in fixed relation to said housing, a free gyroscope having a rotor and pivotally mounted in said housing about two mutually perpendicular axes, said gyroscope being connected to the other lens element of each compound lens and balanced therewith about said axes, and gyroscope precessing means including means defining a segmental spherical member of electrically conducting material secured to said rotor and having a center of curvature disposed at the center of curvature of said compound lens, said spherical member having a plurality of annular grooves with spacings increasing therebetween with respect to increasing radius, and a magnet projecting from said housing in coaxial relation to the first lens element of each pair and into close spaced relation to said spherical member.

References Cited
UNITED STATES PATENTS

| | | | |
|---|---|---|---|
| 1,553,077 | 9/1925 | Henderson | 88—1 |
| 1,628,776 | 5/1927 | Henderson | 88—1 |
| 2,417,689 | 3/1947 | Johnson. | |
| 2,594,406 | 4/1952 | Draper. | |
| 2,709,922 | 6/1955 | Knutson | 74—5.6 |
| 2,780,140 | 2/1957 | Luboshez. | |
| 2,959,088 | 9/1960 | Rantsch | 88—1 |

DAVID H. RUBIN, *Primary Examiner.*

JEWELL H. PEDERSEN, *Examiner.*

P. R. MILLER, *Assistant Examiner.*